US010192046B2

(12) United States Patent
Qu (10) Patent No.: US 10,192,046 B2
(45) Date of Patent: Jan. 29, 2019

(54) UNLOCKING CONTROL METHOD AND APPARATUS FOR INTELLIGENT TERMINAL (71) Applicant: TENCENT TECHNOLOGY (SHENZHEN) COMPANY LIMITED, Shenzhen (CN)

(72) Inventor: Jia Qu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 288 days.

(21) Appl. No.: 15/197,864

(22) Filed: Jun. 30, 2016

(65) Prior Publication Data

US 2016/0306957 A1 Oct. 20, 2016

Related U.S. Application Data (63) Continuation of application No. PCT/CN2015/071430, filed on Jan. 23, 2015.

(30) Foreign Application Priority Data

Jan. 24, 2014 (CN) .......................... 2014 1 0034025

(51) Int. Cl.
G06F 21/00 (2013.01)
G06F 21/35 (2013.01)
(Continued)

(52) U.S. Cl.
CPC ............ G06F 21/35 (2013.01); G06F 3/0482 (2013.01); G06F 3/0484 (2013.01);
(Continued)

(58) Field of Classification Search
CPC ...... G06F 21/35; G06F 3/167; G06F 3/04883; G06F 3/0482; G06F 3/0484; G06F 21/36; G06F 3/0488
See application file for complete search history.

(56) References Cited

U.S. PATENT DOCUMENTS

2009/0278807 A1 11/2009 Hu
2011/0260829 A1* 10/2011 Lee ....................... G06F 3/0414
340/5.51
(Continued)

FOREIGN PATENT DOCUMENTS

CN 101384051 A 3/2009
CN 102236527 A 11/2011
(Continued)

OTHER PUBLICATIONS

Search Report in International Application No. PCT/CN2015/071430 dated Apr. 29, 2015, 2 pages.
(Continued)

Primary Examiner — Morshed Mehedi
(74) Attorney, Agent, or Firm — Marshall, Gerstein & Borun LLP (57) ABSTRACT This application discloses an unlocking control method and apparatus for an intelligent terminal, including: detecting, when an intelligent terminal enters an unlocking interface, a touch gesture on a touch display of an intelligent terminal; and determining whether a trajectory node of the detected touch gesture and a stay time on the trajectory node are the same as a predetermined trajectory node and a predetermined stay time on the trajectory node, and if same, unlocking an intelligent terminal. By using the present disclosure, lock screen cracking difficulty may be increased, and security of a lock screen state may be improved.

13 Claims, 7 Drawing Sheets (51) Int. Cl.
  *G06F 3/0488* (2013.01)
  *G06F 21/36* (2013.01)
  *G06F 3/0482* (2013.01)
  *G06F 3/0484* (2013.01)
  *G06F 3/16* (2006.01)

(52) U.S. Cl.
  CPC ........ *G06F 3/0488* (2013.01); *G06F 3/04883* (2013.01); *G06F 3/167* (2013.01); *G06F 21/36* (2013.01)

(56) References Cited

U.S. PATENT DOCUMENTS

| | | | |
|---|---|---|---|
| 2012/0194440 A1* | 8/2012 | Ramrattan | G06F 3/04883 345/173 |
| 2013/0235704 A1* | 9/2013 | Grinberg | G04G 21/08 368/69 |
| 2015/0033326 A1* | 1/2015 | Fang | G06F 3/04842 726/16 |
| 2015/0040024 A1* | 2/2015 | Higashibeppu | G06F 3/04883 715/741 |
| 2015/0047017 A1* | 2/2015 | Kim | G06F 21/32 726/19 |
| 2015/0123925 A1* | 5/2015 | Qin | G06F 21/31 345/173 |
| 2016/0212258 A1* | 7/2016 | Yin | G06F 21/34 |
| 2017/0115736 A1* | 4/2017 | Patel | G06F 3/017 |

FOREIGN PATENT DOCUMENTS

| | | |
|---|---|---|
| CN | 102833402 A | 12/2012 |
| CN | 103135822 A | 6/2013 |
| CN | 103150107 A | 6/2013 |
| CN | 103294942 A | 9/2013 |
| CN | 103399709 A | 11/2013 |
| CN | 103455276 A | 12/2013 |
| CN | 103473000 A | 12/2013 |

OTHER PUBLICATIONS

International Preliminary Report on Patentability and Written Opinion in International Application No. PCT/CN2015/071430 dated Jul. 26, 2016, 5 pages.
CN 2014100340253, First Office Action, dated Jul. 2, 2018 (10 pages) and Concise Explanation of Relevance of First Office Action.

* cited by examiner

UNLOCKING CONTROL METHOD AND APPARATUS FOR INTELLIGENT TERMINAL

This application is a continuation of International Application No. PCT/CN2015/071430, filed on Jan. 23, 2015, which claims the benefit and priority of Chinese Application No. 201410034025.3, filed on Jan. 24, 2014. The entire disclosures of each of the above applications are incorporated herein by reference.

FIELD OF THE INVENTION

This application relates to the field of human-computer interaction techniques of intelligent devices, and in particular, to an unlocking control method and apparatus for an intelligent terminal.

BACKGROUND OF THE INVENTION

Human-computer interaction techniques refer to techniques of implementing interaction between a human and a machine in an effective manner by using input and output devices of the machine, and include that a machine provides, by using output or display devices, a human with a large amount of related information, prompts, instructions, and the like and that a human inputs, by using an input device, related information and operation instructions to a machine.

In current work and life, an intelligent terminal having a data processing capability, such as a computer, a smart phone, a palmtop computer, a tablet computer, and a smart TV, has been widely used. Especially, a portable intelligent terminal such as a smart phone, a personal digital assistant (PDA), a pocket PC, and a tablet computer has become an essential tool carried by people. Currently, a human-computer interaction manner of the intelligent terminal mainly includes manners such as a keyboard, a mouse, a touch screen or a multipoint touch screen.

With the widespread of smart phones, the smart phones play a more and more important role in people's daily lives. Besides call and messaging functions, a mobile phone generally stores a large amount of personal information and important data that are related to personal privacy. Therefore, in many cases, when a mobile phone is not in a use state, a user needs to turn on a lock screen to improve security of the mobile phone and avoid loss of important information. Currently, many users use lock screen software to protect security of data in a mobile phone. Main objectives of a lock screen include: (1) protecting private data in a mobile phone; (2) preventing a misoperation; and (3) saving power without turning off system software.

Figure 1:
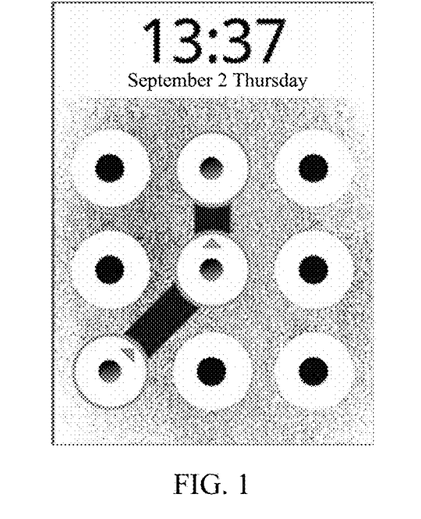
FIG. 1 is a schematic diagram presenting an unlocking control manner for an intelligent terminal in the prior art.

For an unlocking operation of a mobile phone in a lock screen state, current existing technologies include: sliding to unlock a smart phone, gesture-based unlocking, and the like. FIG. 1 is a schematic diagram presenting an unlocking control manner for an intelligent terminal in the prior art. In the prior art, the trajectory of a gesture of sliding on a touch screen by a user is determined, and it is determined whether the trajectory is the same as a preset trajectory. Specifically, it is determined whether trajectory nodes that a gesture successively slides through are the same as preset trajectory nodes in a sequential relationship, and if same, unlocking is performed, or otherwise, unlocking is skipped.

However, screen locking and unlocking manners for a mobile phone in the prior art are already well known and screen locks become easy to crack, which therefore lowers security of a mobile phone to some extent, and results in that information in a mobile phone loses easily.

SUMMARY

In view of this, a main objective of the present disclosure is to provide an unlocking control method and apparatus for an intelligent terminal, so as to increase lock screen cracking difficulty and improve security of a lock screen state.

Technical solutions of the present disclosure are implemented as follows:

An unlocking control method for an intelligent terminal includes:

detecting, when an intelligent terminal enters an unlocking interface, a touch gesture on a touch display of the intelligent terminal; and determining whether a trajectory node of the detected touch gesture and a stay time on the trajectory node are the same as a predetermined trajectory node and a predetermined stay time on the trajectory node, and if same, unlocking the intelligent terminal.

An unlocking control apparatus for an intelligent terminal includes:

a detection module, configured to: when an intelligent terminal enters an unlocking interface, detect a touch gesture on a touch display of the intelligent terminal; and a trajectory and time determining module, configured to determine whether a trajectory node of the detected touch gesture and a stay time on the trajectory node are the same as a predetermined trajectory node and a predetermined stay time on the trajectory node, and if same, unlock the intelligent terminal.

Compared with the prior art, the present disclosure is: when an intelligent terminal enters an unlocking interface, detecting a touch gesture on a touch display of the intelligent terminal; determining whether a trajectory node of the detected touch gesture and a stay time on the trajectory node are the same as a predetermined trajectory node and a predetermined stay time on the trajectory node, and if same, unlocking the intelligent terminal. Therefore, in the present disclosure, during unlocking, not only it needs to be determined whether a trajectory of a touch gesture is the same as a preset trajectory, but also it needs to be determined whether a stay time on each trajectory node is the same as a preset stay time on a corresponding trajectory node, and unlocking is performed only if both are the same, which practically adds an operation dimension to an unlocking operation, thereby greatly increasing lock screen cracking difficulty, improving security of a lock screen state of an intelligent terminal, and more effectively protecting security of data in the intelligent terminal.

BRIEF DESCRIPTION OF THE DRAWINGS

FIG. 4a to FIG. 4d are schematic diagrams of an unlocking setting interface of simultaneously outputting a stay time of a touch gesture on a trajectory node according to the present disclosure;

DESCRIPTION OF EMBODIMENTS

The present disclosure is further described in detail with reference to the accompanying drawings and the specific embodiments.

In the present disclosure, a portable intelligent terminal refers to a portable intelligent terminal having a data calculation processing function, and includes, but is not limited to, a smart phone, a palmtop computer, a tablet computer, a personal digital assistant (PDA), and the like. These portable intelligent terminals are all installed with an operating system, including, but not limited to, an Android operating system, a Symbian operating system, a Windows mobile operating system, an Apple iPhone OS operating system, and the like.

Specific types of some portable intelligent terminals and specific operating system types are listed above in detail. However, a person skilled in the art may understand that, implementation manners of the present disclosure are not limited to the types listed above, and may further be applicable to any other portable intelligent terminal types and operating system types.

Figure 2:
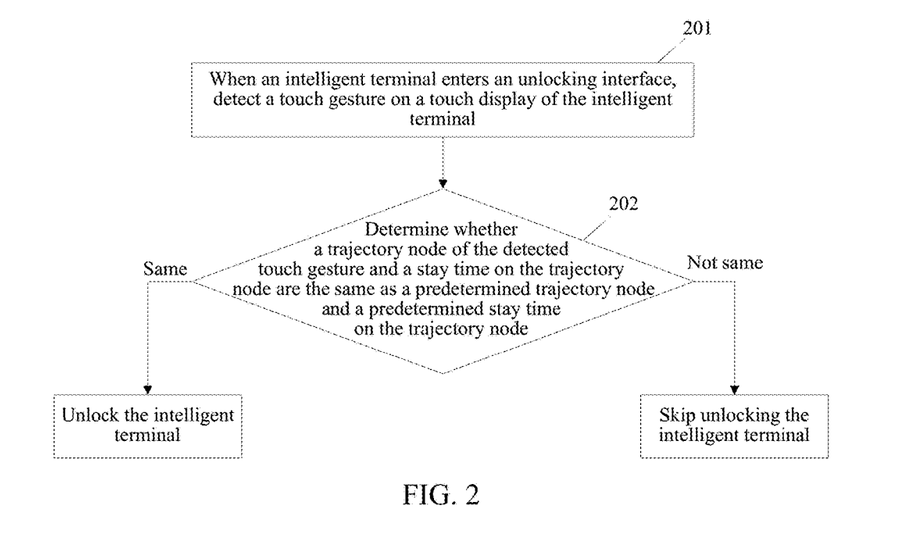
FIG. 2 is a schematic flowchart of an unlocking control method for an intelligent terminal according to the present disclosure.

FIG. 2 is a schematic flowchart of an unlocking control method for an intelligent terminal according to the present disclosure. Referring to FIG. 2, the method mainly includes:

Step 201: When an intelligent terminal enters an unlocking interface, detect a touch gesture on a touch display of the intelligent terminal.

Step 202: Determine whether a trajectory node of the detected touch gesture and a stay time on the trajectory node are the same as a predetermined trajectory node and a predetermined stay time on the trajectory node, and if same, unlock the intelligent terminal, or otherwise, skip unlocking the intelligent terminal.

Figure 3A:
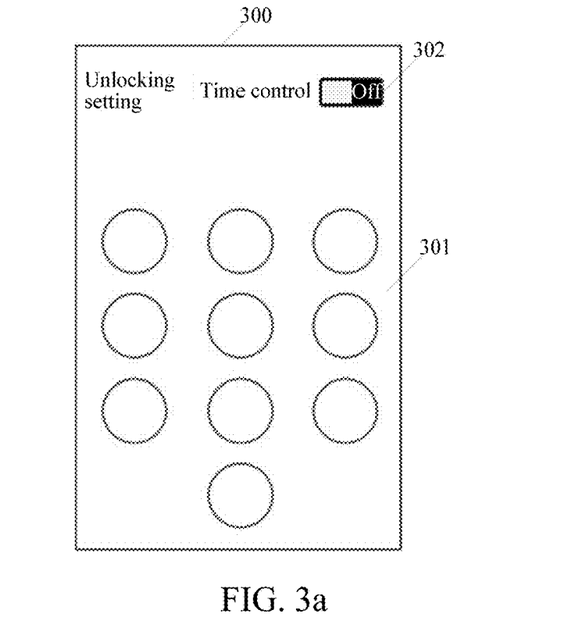
FIG. 3a and FIG. 3b show schematic diagrams of an unlocking setting interface according to the present disclosure.
Figure 3B:
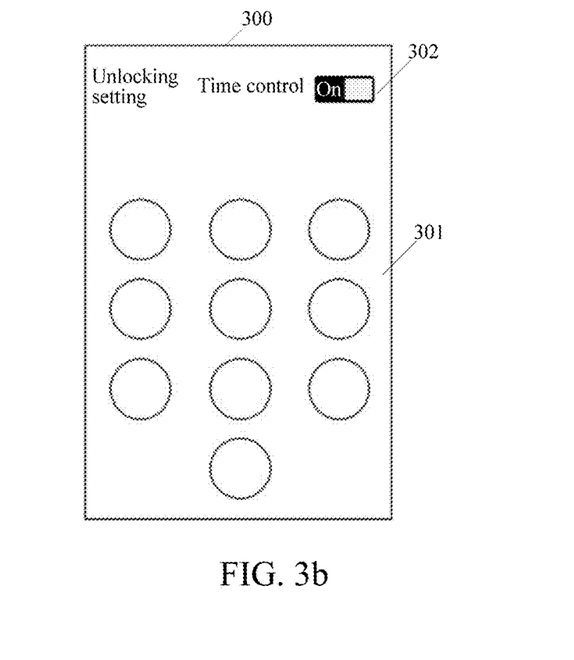

The predetermined trajectory node and the predetermined stay time on the trajectory node are set according to a touch gesture input by a user. Therefore, the method further includes: providing an unlocking setting interface. FIG. 3a and FIG. 3b show schematic diagrams of an unlocking setting interface according to the present disclosure. Referring to FIG. 3a and FIG. 3b, a simulated unlocking interface 301 is displayed in the unlocking setting interface 300, and a candidate node is provided in the unlocking interface. For example, there are 10 candidate nodes in FIG. 3. The trajectory node in the present disclosure refers to a candidate node through which a trajectory generated after the touch gesture contacts and slides on a screen passes.

In the unlocking setting interface, the touch gesture on the touch display of the intelligent terminal needs to be detected in the simulated unlocking interface 301, and the trajectory node of the detected touch gesture and the stay time on the trajectory node are stored as the predetermined trajectory node and the predetermined stay time on the trajectory node. A specific storage manner is: as a touch gesture moves, recording each trajectory node of a trajectory of the touch gesture, measuring a stay time of the gesture on each trajectory node, record the stay time on the trajectory node until the touch gesture is ended. The stored trajectory nodes are sequenced according to an order of contacts of the touch gesture, and each trajectory node corresponds to a stay time on the trajectory node.

In a preferred implementation manner, the control method of the present disclosure further includes: setting a time control unlocking switch, and providing a setting interface of the time control unlocking switch, which is generally a switch button, for example, a "time control" switch button 302 in the upper right of a screen in FIG. 3a and FIG. 3b. A state of the switch button 302 may be set and changed by a user.

If the switch button 302 is in an off state, as shown in FIG. 3a, when the touch gesture on the touch display of the intelligent terminal is detected in the simulated unlocking interface 301, only the trajectory node of the detected touch gesture is recorded, and the trajectory node of the detected touch gesture is stored as the predetermined trajectory node.

If the switch button 302 is set to an on state, as shown in FIG. 3b, when the touch gesture on the touch display of the intelligent terminal is detected in the simulated unlocking interface 301, the trajectory node of the detected touch gesture and the stay time on the trajectory node are recorded, and the trajectory node of the detected touch gesture and the stay time on the trajectory node are stored as the predetermined trajectory node and the predetermined stay time on the trajectory node.

Figure 4A:
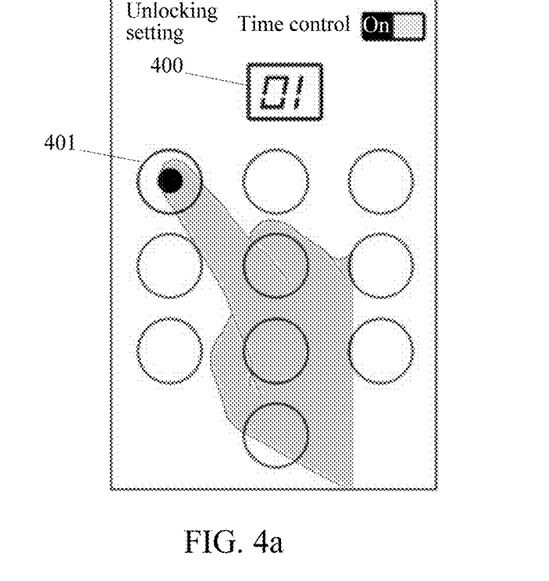
Figure 4B:
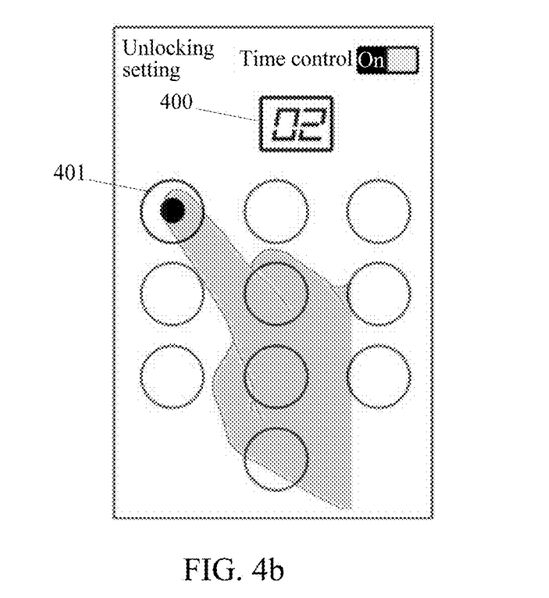

In a preferred embodiment, when the touch gesture on the touch display of the intelligent terminal is detected in the unlocking setting interface, the method further includes: when each trajectory node of the touch gesture is detected, measuring the stay time of the touch gesture on the trajectory node, and dynamically outputting the stay time of the touch gesture on the trajectory node. FIG. 4a to FIG. 4d are schematic diagrams of an unlocking setting interface of simultaneously outputting a stay time of a touch gesture on a trajectory node according to the present disclosure. Referring to FIG. 4a, when the user touches a first node such as a node 401, record the node 401, start to measure a stay time during which a finger stays on the node 401, and dynamically output the stay time of the touch gesture on the trajectory node, for example, dynamically and synchronously display the stay time of the touch gesture on the trajectory node in a specified area, for example, an area 400, of the display; for example, the touch gesture stays on the node 401 for 2 seconds, and as shown in FIG. 4b, the stay time can be dynamically displayed in the area 400. Certainly, an audio time announcement of the stay time of the touch gesture on the trajectory node may also be dynamically and synchronously output by using a loudspeaker.

Figure 4C:
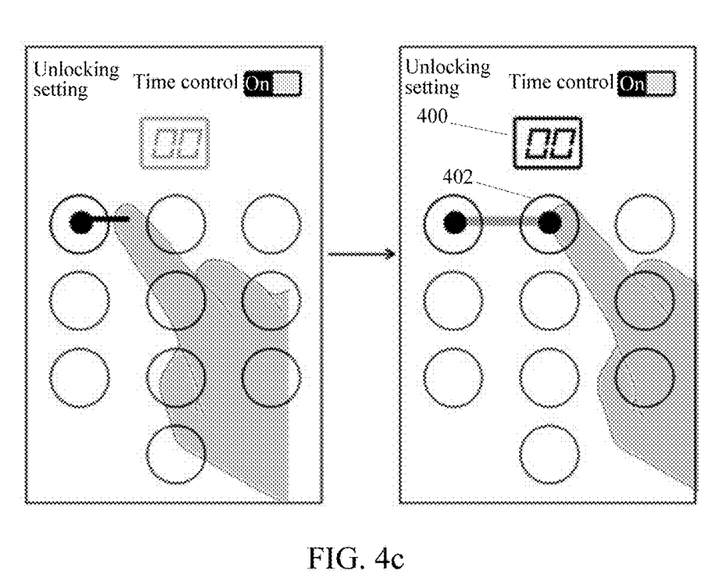
Figure 4D:
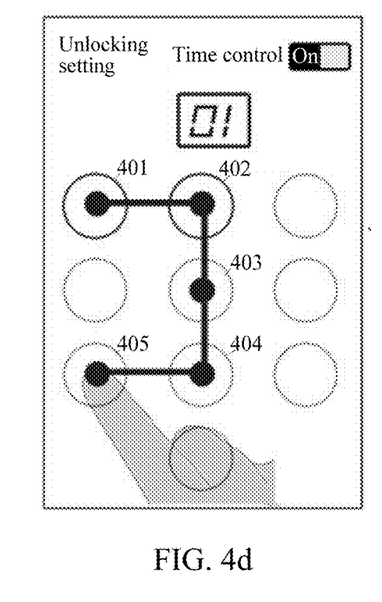

When the gesture of the user moves to a next node, record the stay time of the gesture on the previous node, where for example, the stay time on the node 401 here is 2 seconds. Next, repeat the foregoing process. As shown in FIG. 4c and FIG. 4d, when the gesture moves out of the first node 401, reset the time in the area 400. When the gesture moves to a second node 402, record the second node 402, measure a stay time of the finger on the node 402, and dynamically display, in the area 400, the stay time of the touch gesture on the trajectory node. When the gesture of the user moves out of the second node 402, record the stay time of the gesture on the second node 402, for example, 1 second; repeat the process until the touch gesture is ended, as shown in FIG. 4d. According to the foregoing setting, it is assumed that the preset trajectory node and the preset stay time on the trajectory node are shown in Table 1 as follows:

TABLE 1

| Order of trajectory nodes | Trajectory node | Time during which a gesture stays on a trajectory node |
|---|---|---|
| 1 | Node 401 | 2 seconds |
| 2 | Node 402 | 1 second |
| 3 | Node 403 | 3 seconds |
| 4 | Node 404 | 2 seconds |
| 5 | Node 405 | 1 second |

In this way, the predetermined trajectory node and the predetermined stay time on the trajectory node may be set by using the foregoing unlocking setting interface.

After a screen of the intelligent terminal is locked, perform a turn-on operation. For example, press a button such as a power button or a "Back To Main Menu" button to turn on the screen, and in this state, the screen is turned on, and the unlocking interface is entered. In this case, the method may further determine a state of the time control unlocking switch:

If in an off state, according to a manner in the prior art, detect the touch gesture on the touch display of the intelligent terminal, determine whether the trajectory node of the detected touch gesture is the same as the predetermined trajectory node, and if same, unlock the intelligent terminal, or otherwise, skip unlocking.

If in an on state, detect the touch gesture on the touch display of the intelligent terminal, determine whether the trajectory node of the detected touch gesture and the stay time on the trajectory node are the same as the predetermined trajectory node and the predetermined stay time on the trajectory node, and if same, unlock the intelligent terminal, or otherwise, skip unlocking.

Figure 5:
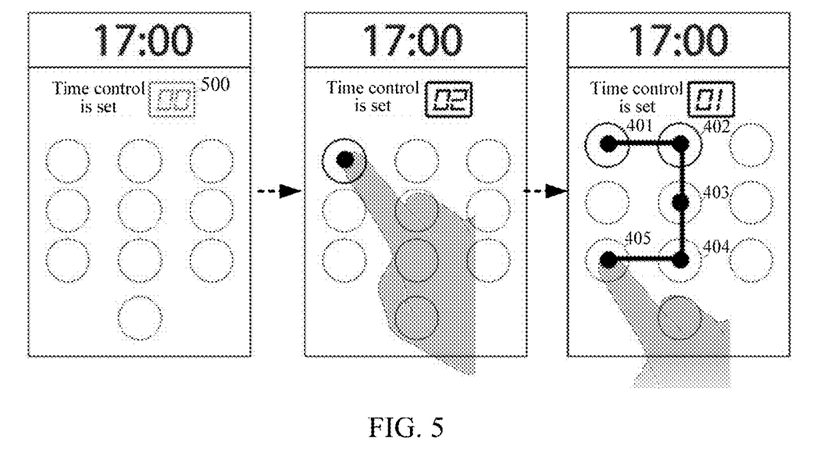
FIG. 5 is a schematic diagram of performing an unlocking operation on an unlocking interface according to the present disclosure.

FIG. 5 is a schematic diagram of performing an unlocking operation on an unlocking interface according to the present disclosure. Referring to FIG. 5, after an intelligent terminal enters an unlocking interface after the screen is locked and a turn-on operation is performed, in this case, it is assumed that a time control unlocking switch is in an on state, so that "Time control is set" is displayed, and a time area 500 used for outputting a stay time is displayed. Next, detect a touch gesture on a touch display of the intelligent terminal, and determine whether a trajectory node of the detected touch gesture and a stay time on the trajectory node are the same as a predetermined trajectory node and a predetermined stay time on the trajectory node.

In a preferred embodiment, when the touch gesture on the touch display of the intelligent terminal is detected, the method further includes: measuring, when each trajectory node of the touch gesture is detected, the stay time of the touch gesture on the trajectory node, and dynamically outputting the stay time of the touch gesture on the trajectory node, for example, in FIG. 5, dynamically and synchronously displaying, in the area 500 of the unlocking interface, the stay time of the touch gesture on the trajectory node; or, synchronously outputting, by using a loudspeaker, an audio time announcement of the stay time of the touch gesture on the trajectory node.

In a specific embodiment, the determining whether a trajectory node of the detected touch gesture and a stay time on the trajectory node are the same as a predetermined trajectory node and a predetermined stay time on the trajectory node specifically includes:

presetting an unlocking flag bit, where an initial state of the unlocking flag bit is a correct state; and performing the following operations on an $n^{th}$ trajectory node from a first trajectory node of the detected touch gesture:

A. determining whether the $n^{th}$ trajectory node is the same as a predetermined $n^{th}$ trajectory node, where n is a natural number starting from 1; and if not same, setting the unlocking flag bit to an incorrect state, and turning to subsequent step D; or if same, turning to step B; for example, as shown in FIG. 1, determining first whether a detected first trajectory node is the node 401, and if not, setting the unlocking flag bit to an incorrect state, and turning to subsequent step D, or if yes, turning to step;

B. determining whether a stay of the touch gesture stays on the $n^{th}$ trajectory node is the same as a predetermined stay time on the $n^{th}$ trajectory node; and if not same, setting the unlocking flag bit to an incorrect state, and performing subsequent step D; or if same, performing step C; for example, as shown in Table 1, in a case in which the detected first trajectory node is the node 401, determining whether a stay time on the node 401 is 2 seconds, if not, setting the unlocking flag bit is set to an incorrect state, and turning to subsequent step D, or if yes, turning to step B;

C. continuing to detect a next trajectory node of the touch gesture, if the next trajectory node of the touch gesture is detected, returning to step A, and if it is detected that the touch gesture is ended, performing step D; and D. determining whether the unlocking flag bit is in a correct state, if in a correct state, determining that the trajectory node of the detected touch gesture and the stay time on the trajectory node are the same as the predetermined trajectory node and the predetermined stay time on the trajectory node, and in this case, unlocking the intelligent terminal, or otherwise, determining that the trajectory node of the detected touch gesture and the stay time on the trajectory node are not the same as the predetermined trajectory node and the predetermined stay time on the trajectory node, and in this case, skipping unlocking the intelligent terminal, where the intelligent terminal is still in a lock screen state.

As shown in FIG. 5, if a trajectory node through which a touch gesture of a user passes and a stay time on the trajectory node are the same as a preset trajectory node and a preset stay time on the trajectory node in Table 1, unlock the intelligent terminal, or otherwise, skip unlocking.

As described above, compared with the prior art, in the present disclosure, during unlocking, not only it needs to be determined whether a trajectory of a touch gesture is the same as a preset trajectory, but also it needs to be determined whether a stay time on each trajectory node is the same as a preset stay time on a corresponding trajectory node, and unlocking is performed only if both are the same, which practically adds an operation dimension to an unlocking operation, thereby greatly increasing lock screen cracking difficulty, improving security of a lock screen state of an intelligent terminal, and more effectively protecting security of data in the intelligent terminal.

In a further embodiment of the present invention, after the determining that the trajectory node of the detected touch gesture and the stay time on the trajectory node are the same as the predetermined trajectory node and the predetermined stay time on the trajectory node, and before the unlocking the intelligent terminal, the method further includes:

displaying a preset option list, receiving a selection instruction for an option, determining whether the selected option is the same as a preset correct option, and if same, unlocking the intelligent terminal, or otherwise, skipping unlocking the intelligent terminal, where the preset correct option may be set in the unlocking setting interface, and the option may be an element stored in the intelligent terminal, for example, a name of a music ringtone, or even a name of an application program or an icon.

For example, according to the method, a name of a music ringtone, a name of an application program, or a desktop icon in an operating system of the intelligent terminal may be acquired as an option material, and the option material is added to a temporary resource library. When a correct option is set in the unlocking setting interface, the option material is read from the temporary resource library and is output and displayed in a candidate list, and the user selects at least one option from the candidate list as the correct option, and stores the correct option. After the determining that the trajectory node of the detected touch gesture and the stay time on the trajectory node are the same as the predetermined trajectory node and the predetermined stay time on the trajectory node, and before the unlocking the intelligent terminal, output the correct option set by a user to an option list of the unlocking interface, randomly select another material option from the temporary resource library and output the material option to the option list of the unlocking interface, and if the user selects the correct option, perform unlocking, or otherwise, skip unlocking.

As described above, based on an unlocking dimension of increasing a stay time on a trajectory node, in the foregoing embodiment, an option dimension is further added to perform unlocking verification, thereby further increasing lock screen cracking difficulty, improving security of a lock screen state of an intelligent terminal, and more effectively protecting security of data in the intelligent terminal.

Figure 6:
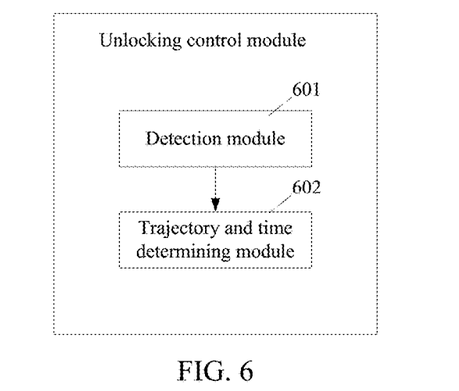
FIG. 6 is a schematic composition diagram of an unlocking control apparatus for an intelligent terminal according to the present disclosure.

Corresponding to the method of the present disclosure, the present disclosure further discloses an unlocking control apparatus for an intelligent terminal, where the unlocking control apparatus may be installed in an intelligent terminal, and unlocks a lock screen state of the intelligent terminal. FIG. 6 is a schematic composition diagram of an unlocking control apparatus for an intelligent terminal according to the present disclosure. Referring to FIG. 6, the unlocking control apparatus 600 includes:

a detection module 601, configured to: when the intelligent terminal enters an unlocking interface, detect a touch gesture on a touch display of the intelligent terminal; and a trajectory and time determining module 602, configured to determine whether a trajectory node of the detected touch gesture and a stay time on the trajectory node are the same as a predetermined trajectory node and a predetermined stay time on the trajectory node, and if same, unlock the intelligent terminal.

Figure 7:
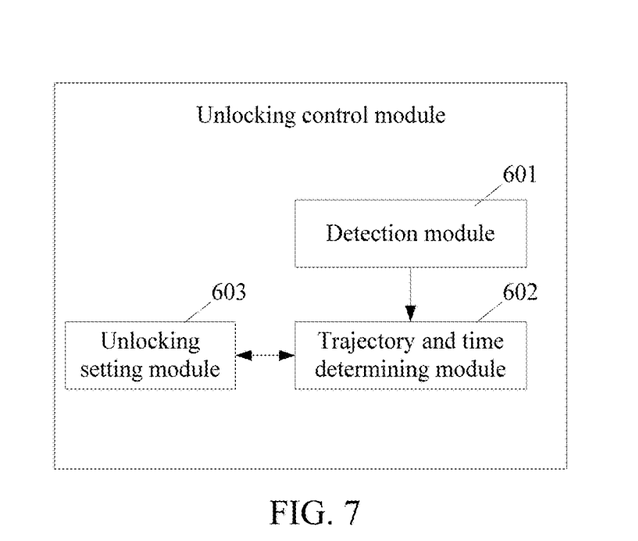
FIG. 7 is another schematic composition diagram of an unlocking control apparatus for an intelligent terminal according to the present disclosure.

FIG. 7 is another schematic composition diagram of an unlocking control apparatus for an intelligent terminal according to the present disclosure. In the preferred embodiment, the control apparatus further includes an unlocking setting module 603, configured to provide an unlocking setting interface, display a simulated unlocking interface in the unlocking setting interface, detect, in the simulated unlocking interface, a touch gesture on a touch display of the intelligent terminal, and store a trajectory node of the detected touch gesture and the stay time on the trajectory node as the predetermined trajectory node and the predetermined stay time on the trajectory node.

In a specific embodiment, the unlocking setting module is further configured to:

set a time control unlocking switch, and provide a setting interface of the time control unlocking switch (such as the switch button 302 in FIG. 3a and FIG. 3b); and further determine a state of the time control unlocking switch when the intelligent terminal enters the unlocking setting interface;

if in an on state, when the touch gesture on the touch display of the intelligent terminal is detected in the simulated unlocking interface, record the trajectory node of the detected touch gesture and the stay time on the trajectory node, and store the trajectory node of the detected touch gesture and the stay time on the trajectory node as the predetermined trajectory node and the predetermined stay time on the trajectory node; and if in an off state, when the touch gesture on the touch display of the intelligent terminal is detected in the simulated unlocking interface, record the trajectory node of the detected touch gesture, and store the trajectory node of the detected touch gesture as the predetermined trajectory node.

Figure 8:
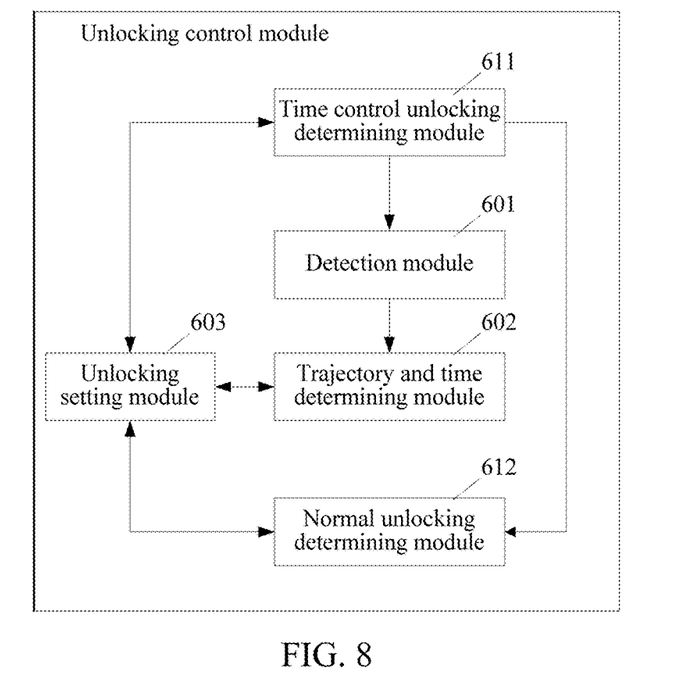
FIG. 8 is still another schematic composition diagram of an unlocking control apparatus for an intelligent terminal according to the present disclosure.

FIG. 8 is still another schematic composition diagram of an unlocking control apparatus for an intelligent terminal according to the present disclosure. Referring to FIG. 8, in this embodiment, the unlocking control apparatus further includes:

a time control unlocking determining module 611, configured to further determine the state of the time control unlocking switch when an intelligent terminal enters an unlocking interface; and if in an on state, trigger the trajectory and time determining module 602, where the trajectory and time determining module 602 determines whether the trajectory node of the detected touch gesture and a stay time on the trajectory node are the same as the predetermined trajectory node and the predetermined stay time on the trajectory node, and if same, unlock the intelligent terminal, or otherwise, skip unlocking; or if in an off state, trigger a normal unlocking determining module 612; and the normal unlocking determining module 612, configured to determine whether the trajectory node of the detected touch gesture is the same as the predetermined trajectory node, and if same, unlock the intelligent terminal, or otherwise, skip unlocking.

In a preferred embodiment, the control apparatus further includes a stay time output module, and the stay time output module may be disposed in the unlocking setting module 603 and the trajectory and time determining module 602, and is configured to: when each trajectory node of the touch gesture is detected, measure the stay time of the touch gesture on the trajectory node, and dynamically output the stay time of the touch gesture on the trajectory node, as shown in FIG. 3a, FIG. 3b, FIG. 4a to FIG. 4d, and FIG. 5.

The stay time output module is specifically configured to: dynamically and synchronously output, to a display, the stay time of the touch gesture on the trajectory node; or, dynamically and synchronously output, to a loudspeaker, an audio time announcement of the stay time of the touch gesture on the trajectory node.

In a specific embodiment, the trajectory and time determining module 602 specifically includes:

an unlocking flag bit submodule, configured to preset an unlocking flag bit, where an initial state of the unlocking flag bit is a correct state;

a trajectory detection submodule, configured to detect the trajectory node of the detected touch gesture and the stay time on the trajectory node, and after a first trajectory node is detected, trigger a subsequent first determining submodule;

the first determining submodule, configured to determine whether an $n^{th}$ trajectory node is the same as a predetermined $n^{th}$ trajectory node, where n is a natural number starting from 1, and if not same, set the unlocking flag bit to an incorrect state, and turn to a fourth determining submodule, or if same, turn to a second determining submodule;

the second determining submodule, configured to determine whether a stay time of the touch gesture on the $n^{th}$ trajectory node is the same as a predetermined stay time of the touch gesture on the $n^{th}$ trajectory node; if not same, set the unlocking flag bit to an incorrect state, and turn to the fourth determining submodule; or if yes, turn to a third determining submodule;

the third determining submodule, configured to determine whether the trajectory detection submodule has detected a next trajectory node of the touch gesture, if the next trajectory node of the touch gesture is detected, return to the first determining submodule, and if it is detected that the touch gesture is ended, turn to the fourth determining submodule; and the fourth determining submodule, configured to determine whether the unlocking flag bit is in a correct state, and if in a correct state, determine that the trajectory node of the detected touch gesture and the stay time on the trajectory node are the same as the predetermined trajectory node and the predetermined stay time on the trajectory node, or otherwise, determine that the trajectory node of the detected touch gesture and the stay time on the trajectory node are not the same as the predetermined trajectory node and the predetermined stay time on the trajectory node.

Figure 9:
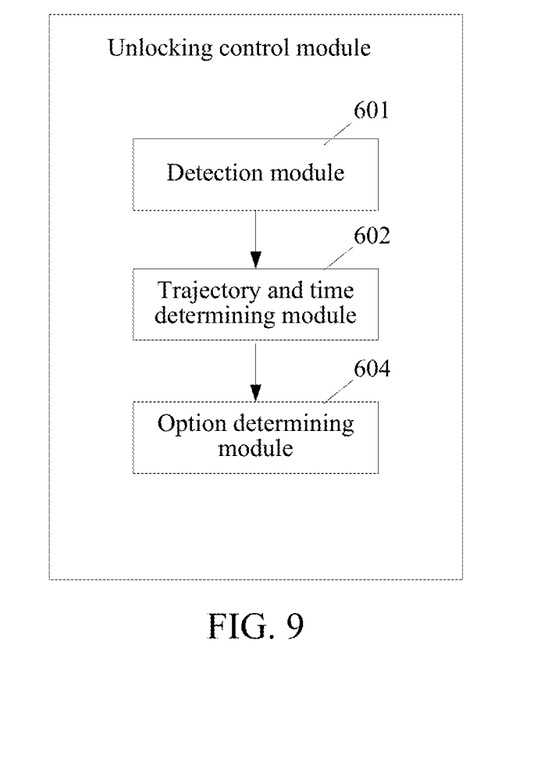
FIG. 9 is yet another schematic composition diagram of an unlocking control apparatus for an intelligent terminal according to the present disclosure.

FIG. 9 is yet another schematic composition diagram of an unlocking control apparatus for an intelligent terminal according to the present disclosure. The apparatus further includes an option determining module 604, and after determining that the trajectory node of the detected touch gesture and the stay time on the trajectory node are the same as the predetermined trajectory node and the predetermined stay time on the trajectory node, the trajectory and time determining module 602 triggers the option determining module 604 instead of unlocking the intelligent terminal; and the option determining module 604 is configured to display a preset option list, receive a selection instruction for an option, determine whether the selected option is the same as a preset correct option, and if same, unlock the intelligent terminal, or otherwise, skip unlocking the intelligent terminal.

In addition, each embodiment of the present invention may be implemented by a data processing program that is executed by a data processing device such as a computer. Obviously, the data processing program constitutes the present disclosure. In addition, generally a data processing program stored in a storage medium is executed by directly reading the program from the storage medium or by installing or copying the program to a storage device (such as a hard disk or memory) of a data processing device. Therefore, such a storage medium also constitutes the present disclosure. The storage medium may use any type of recording, for example, a paper storage medium (such as a paper tape), a magnetic storage medium (such as a floppy disk, a hard disk, or a flash memory), an optical storage medium (such as a CD-ROM), or a magneto-optical storage medium (such as an MO).

Therefore, the present disclosure further discloses a storage medium, having a data processing program stored therein, the data processing program being used to perform any one of the embodiments of the method in the present disclosure.

The foregoing descriptions are merely preferred embodiments of the present invention, but are not intended to limit the present disclosure. Any modification, equivalent replacement, or improvement made within the spirit and principle of the present disclosure shall fall within the protection scope of the present disclosure.

What is claimed is:

1. An unlocking control method for an intelligent terminal, comprising:

detecting, when an intelligent terminal enters an unlocking interface, a touch gesture on a touch display of the intelligent terminal; and determining whether a trajectory node of the detected touch gesture and a stay time on the trajectory node are the same as a predetermined trajectory node and a predetermined stay time on the trajectory node which are stored by the intelligent terminal, and if same, unlocking the intelligent terminal;

wherein the determining whether a trajectory node of the detected touch gesture and a stay time on the trajectory node are the same as a predetermined trajectory node and a predetermined stay time on the trajectory node specifically comprises:

presetting an unlocking flag bit, wherein an initial state of the unlocking flag bit is a correct state; and performing the following operations on an nth trajectory node from a first trajectory node of the detected touch gesture:

A. determining whether the nth trajectory node is the same as a predetermined nth trajectory node, wherein n is a natural number starting from 1, and if not same, setting the unlocking flag bit to an incorrect state, and performing subsequent step D, or if same, turning to step B;

B. determining whether a stay time of the touch gesture on the nth trajectory node is the same as a predetermined stay time on the nth trajectory node, and not same, setting the unlocking flag bit to an incorrect state, and performing subsequent step D, or if same, turning to step C;

C. continuing to detect a next trajectory node of the touch gesture, if the next trajectory node of the touch gesture is detected, returning to step A, and if it is detected that the touch gesture is ended, turning to step D; and D. determining whether the unlocking flag bit is in a correct state, and if in a correct state, determining that the trajectory node of the detected touch gesture and the stay time on the trajectory node are the same as the predetermined trajectory node and the predetermined stay time on the trajectory node, or otherwise, determining that the trajectory node of the detected touch gesture and the stay time on the trajectory node are not the same as the predetermined trajectory node and the predetermined stay time on the trajectory node.

2. The method according to claim 1, wherein the predetermined trajectory node and the predetermined stay time on the trajectory node are set according to an input touch gesture; and the method further comprises: providing an unlocking setting interface, displaying a simulated unlocking interface in the unlocking setting interface, detecting, in the simulated unlocking interface, a touch gesture on the touch display of the intelligent terminal, and storing the trajectory node of the detected touch gesture and the stay time on the trajectory node as the predetermined trajectory node and the predetermined stay time on the trajectory node.

3. The method according to claim 2, wherein the method further comprises: setting a time control unlocking switch, and providing a setting interface of the time control unlocking switch on the unlocking setting interface;
  determining further a state of the time control unlocking switch when the intelligent terminal enters the unlocking setting interface;
  recording, if in an on state, when the touch gesture on the touch display of the intelligent terminal is detected in the simulated unlocking interface, the trajectory node of the detected touch gesture and the stay time on the trajectory node, and storing the trajectory node of the detected touch gesture and the stay time on the trajectory node as the predetermined trajectory node and the predetermined stay time on the trajectory node; and
  recording, if in an off state, when the touch gesture on the touch display of the intelligent terminal is detected in the simulated unlocking interface, the trajectory node of the detected touch gesture, and storing the trajectory node of the detected touch gesture as the predetermined trajectory node.

4. The method according to claim 3, wherein,
  determining further the state of the time control unlocking switch when the intelligent terminal enters the unlocking interface,
  detecting, if in an on state, the touch gesture on the touch display of the intelligent terminal, determining whether the trajectory node of the detected touch gesture and the stay time on the trajectory node are the same as the predetermined trajectory node and the predetermined stay time on the trajectory node, and if same, unlocking the intelligent terminal, or otherwise, skipping unlocking; and
  detecting, if in an off state, the touch gesture on the touch display of the intelligent terminal, determining whether the trajectory node of the detected touch gesture is the same as the predetermined trajectory node, and if same, unlocking the intelligent terminal, or otherwise, skipping unlocking.

5. The method according to claim 1, at the same time of detecting a touch gesture on a touch display of the intelligent terminal, the method further comprising:
  measuring, when each trajectory node of the touch gesture is detected, the stay time of the touch gesture on the trajectory node, and dynamically outputting the stay time of the touch gesture on the trajectory node.

6. The method according to claim 5, wherein the dynamically outputting the stay time of the touch gesture on the trajectory node specifically comprises: dynamically and synchronously displaying, on the display, the stay time of the touch gesture on the trajectory node; or, dynamically and synchronously outputting, by using a loudspeaker, an audio time announcement of the stay time of the touch gesture on the trajectory node.

7. The method according to claim 1, after the determining that the trajectory node of the detected touch gesture and the stay time on the trajectory node are the same as the predetermined trajectory node and the predetermined stay time on the trajectory node, and before unlocking the intelligent terminal, further comprising:
  displaying a preset option list, receiving a selection instruction for an option, determining whether the selected option is the same as a preset correct option, and if same, unlocking the intelligent terminal, or otherwise, skipping unlocking the intelligent terminal.

8. An unlocking control apparatus for an intelligent terminal, comprising a processor coupled to a memory storing instructions for execution by the processor, and the instructions comprises:
  a detection instruction, configured to: when an intelligent terminal enters an unlocking interface, detect a touch gesture on a touch display of the intelligent terminal; and
  a trajectory and time determining instruction, configured to determine whether a trajectory node of the detected touch gesture and a stay time on the trajectory node are the same as a predetermined trajectory node and a predetermined stay time on the trajectory node which are stored by the unlocking apparatus, and if same, unlock the intelligent terminal;
  wherein the trajectory and time determining instruction specifically comprises:
  an unlocking flag bit sub-instruction, configured to preset an unlocking flag bit, wherein an initial state of the unlocking flag bit is a correct state;
  a trajectory detection sub-instruction, configured to detect the trajectory node of the touch gesture and the stay time on the trajectory node, and after a first trajectory node is detected, trigger a subsequent first determining sub-instruction;
  the first determining sub-instruction, configured to determine whether an nth trajectory node is the same as a predetermined nth trajectory node, wherein n is a natural number starting from 1, and if not same, set the unlocking flag bit to an incorrect state, and turn to a fourth determining sub-instruction, or if same, turn to a second determining sub-instruction;
  the second determining sub-instruction, configured to determine whether a stay time of the touch gesture on the nth trajectory node is the same as a predetermined stay time on the nth trajectory node, and not same, set the unlocking flag bit to an incorrect state, and turn to the fourth determining sub-instruction, or if same, turn to a third determining sub-instruction;
  the third determining sub-instruction, configured to determine whether the trajectory detection sub-instruction has detected a next trajectory node of the touch gesture, if the next trajectory node of the touch gesture is detected, return to the first determining sub-instruction, and if it is detected that the touch gesture is ended, turn to the fourth determining sub-instruction; and
  the fourth determining sub-instruction, configured to determine whether the unlocking flag bit is in a correct state, and if in a correct state, determine that the trajectory node of the detected touch gesture and the stay time on the trajectory node are the same as the predetermined trajectory node and the predetermined stay time on the trajectory node, or otherwise, determine that the trajectory node of the detected touch gesture and the stay time on the trajectory node are not the same as the predetermined trajectory node and the predetermined stay time on the trajectory node.

9. The apparatus according to claim 8, wherein the instruction further comprises an unlocking setting instruction, configured to provide an unlocking setting interface, display a simulated unlocking interface in the unlocking setting interface, detect, in the simulated unlocking interface, a touch gesture on the touch display of the intelligent terminal, and store the trajectory node of the detected touch gesture and the stay time on the trajectory node as the predetermined trajectory node and the predetermined stay time on the trajectory node.

10. The apparatus according to claim 9, wherein, the unlocking setting instruction is further configured to:
set a time control unlocking switch, and provide a setting interface of the time control unlocking switch; and further determine a state of the time control unlocking switch when the intelligent terminal enters the unlocking setting interface,
if in an on state, when the touch gesture on the touch display of the intelligent terminal is detected in the simulated unlocking interface, record the trajectory node of the detected touch gesture and the stay time on the trajectory node, and store the trajectory node of the detected touch gesture and the stay time on the trajectory node as the predetermined trajectory node and the predetermined stay time on the trajectory node; and
if in an off state, when the touch gesture on the touch display of the intelligent terminal is detected in the simulated unlocking interface, record the trajectory node of the detected touch gesture, and store the trajectory node of the detected touch gesture as the predetermined trajectory node.

11. The apparatus according to claim 10, wherein the instruction further comprises:
a time control unlocking determining instruction, configured to further determine the state of the time control unlocking switch when the intelligent terminal enters the unlocking interface, and if the time control unlocking switch is in an on state, trigger the trajectory and time determining instruction, or
if the time control unlocking switch is in an off state, trigger a normal unlocking determining instruction; and
the normal unlocking determining instruction, configured to determine whether the trajectory node of the detected touch gesture is the same as the predetermined trajectory node, and if same, unlock the intelligent terminal, or otherwise, skip unlocking.

12. The control apparatus according to claim 8, wherein the instruction further comprises a stay time output instruction, configured to: when each trajectory node of the touch gesture is detected, measure the stay time of the touch gesture on the trajectory node, and dynamically output the stay time of the touch gesture on the trajectory node.

13. The apparatus according to claim 8, wherein the instruction further comprises an option determining instruction, and after determining that the trajectory node of the detected touch gesture and the stay time on the trajectory node are the same as the predetermined trajectory node and the predetermined stay time on the trajectory node, the trajectory and time determining instruction triggers the option determining instruction instead of unlocking the intelligent terminal; and
the option determining instruction, configured to display a preset option list, receive a selection instruction for an option, determine whether the selected option is the same as a preset correct option, and if same, unlock the intelligent terminal, or otherwise, skip unlocking the intelligent terminal.

* * * * *